United States Patent [19]
Prowse et al.

[11] Patent Number: 6,079,198
[45] Date of Patent: Jun. 27, 2000

[54] PRESSURE COMPENSATED FUEL DELIVERY SYSTEM FOR THE COMBUSTORS OF TURBOMACHINERY

[75] Inventors: Kevin Joseph Prowse, Ballston Spa; Howard Jay Kaplan, Clifton Park; George Raymond Hubschmitt, Ballston Lake; Thomas Edward Wickert, Clifton Park, all of N.Y.

[73] Assignee: General Electric Co., Schenectady, N.Y.

[21] Appl. No.: 09/069,409

[22] Filed: Apr. 29, 1998

[51] Int. Cl.⁷ ...................................................... F02C 7/26
[52] U.S. Cl. ................................ 60/39.06; 60/734; 60/739
[58] Field of Search ................................ 60/39.06, 39.37, 60/739, 734, 39.281

[56] References Cited

U.S. PATENT DOCUMENTS

| | | | |
|---|---|---|---|
| 4,608,820 | 9/1986 | White et al. ........................... | 60/39.281 |
| 4,716,719 | 1/1988 | Takahashi et al. ..................... | 60/39.06 |
| 4,987,737 | 1/1991 | Cantwell ............................... | 60/38.281 |
| 5,209,058 | 5/1993 | Sparks et al. .......................... | 60/734 |
| 5,259,186 | 11/1993 | Snow ................................... | 60/39.281 |
| 5,513,493 | 5/1996 | Severn et al. ......................... | 60/39.281 |

*Primary Examiner*—Charles G. Freay
*Attorney, Agent, or Firm*—Nixon & Vanderhye

[57] ABSTRACT

A positive displacement pump supplies a low lubricity liquid fuel through a main supply line to the combustors of a turbine. A pressure transducer and a flow meter are provided in the main fuel supply line. The fuel is supplied to a pressure compensated fuel delivery valve which divides the fuel equally among the combustors and affords pressure compensation. A controller is responsive to the pressure in the main fuel supply line to control a bypass pressure valve to supply fuel in the main supply line at a predetermined pressure. The controller also controls the total volume of fuel flow rate through the pressure compensated fuel delivery valve responsive to the flow meter. In another form, a centrifugal pump supplies fuel to the pressure compensated fuel delivery valve. A controller responsive to the flow meter in the main supply line controls the total fuel flow rate to the valve which divides the fuel equally among the combustors at equal flow rates.

5 Claims, 4 Drawing Sheets

PRESSURE COMPENSATED FUEL DELIVERY SYSTEM FOR THE COMBUSTORS OF TURBOMACHINERY

TECHNICAL FIELD

The present invention relates to a pressure compensated fuel delivery system for supplying liquid fuels to the combustors of a turbine and particularly relates to a liquid fuel delivery system for supplying low lubricity liquid fuels wherein lubricity additives and lubricity dosing equipment are eliminated.

BACKGROUND

Heavy-duty gas turbines with can-annular combustion systems require a liquid fuel delivery system which can control total flow rate to and divide fuel flow accurately and equally among multiple combustion chambers. A can-annular combustion system consists of an arrangement of combustors about the turbine axis, each with a fuel injection system and a transition piece which provides a flow path for the hot gas from the combustor to the inlet of the turbine. Unequal fuel flow distribution to the combustion chambers can lead to temperature non-uniformity about the turbine which in turn can reduce turbine life.

Heavy-duty gas turbine fuel delivery systems with can-annular combustors conventionally include, as major components, a positive displacement fuel pump, a bypass flow control valve, a mechanical flow divider and a controller. The positive displacement pump is driven by the turbine's accessory gear box or by an electric motor. The bypass control valve is positioned by the turbine controller to maintain the desired total liquid fuel flow rate for delivery to the flow divider. The mechanical flow divider, in turn, uses a synchronized arrangement of paired gears to discharge the liquid fuel to the various combustors. Each pair of gears discharges fuel to a single combustor. The gears are identical and rotate at the same speed. Hence, the volumetric flow rate discharged to each combustor is nominally equal. A rotational speed feedback device, i.e., magnetic pick-ups which sense rotation, is installed in the flow divider and provides a signal to the turbine controller proportional to the fuel flow rate. The controller uses the flow divider feedback signal in control algorithms to correctly position the bypass control valve, as well as to carry out other control functions.

The flow divider also contains components which are in constant high speed rotary motion and are heavily loaded. Gears and bearings within the mechanical flow divider are lubricated by the liquid fuel itself. When low lubricity fuels are used, such fuels must be dosed with a fuel additive in order to avoid failure of the flow divider due to premature wear, galling, etc. However, these lubricity additives build up on the surfaces of the flow divider, causing it to bind up after a modest period of operation. The flow divider must then be removed from service, cleaned and overhauled. The additive also builds up on the internal surfaces of check valves downstream of the flow divider, causing them to leak or bind. The additive itself is costly and not always readily available in remote regions of the world.

Existing systems use a positive displacement fuel pump specifically designed for operation with low lubricity fuels. There are drawbacks when using a positive displacement type fuel pump. Pumps of this type have long manufacturing lead times, are expensive as compared to standard distillate fuel pumps, require special bearing lubricating oil system and have less than desired reliability. The pump is a special design with few other applications, and spare parts are not typically readily available. However, there are a very substantial number of low lubricity fuel systems using positive displacement pumps of this type and is not always particularly cost-effective to replace such positive displacement type pumps in existing systems. In new systems employing original equipment, however, other types of pumps can be economically substituted with positive advantages.

The problem addressed herein is to configure the fuel delivery system so as to control and divide fuel flow while accommodating a wide range of liquid fuel types, including fuels with poor lubricating properties and which system offers high reliability, low purchase and operating costs and low maintenance requirements. It is thus desirable to retrofit existing systems without replacement of the high pressure fuel pump, and also to offer original equipment systems which likewise eliminate the lubricity dosing problem and substitute a high reliability conventional centrifugal pump for the specially designed high pressure positive displacement fuel pump.

DISCLOSURE OF THE INVENTION

According to the present invention, a fuel delivery system is provided particularly for use with low lubricity fuels and includes a pressure compensated fuel delivery valve (PCFD valve) comprising a multi-port fuel metering valve incorporating pressure compensation enabling the valve to deliver the same liquid fuel flow rate to each discharge port in communication with a combustor, notwithstanding line-to-line variations in delivery pressure. The valve thus performs the functions of flow control and flow division in a manner not requiring lubrication by the fuel.

In a particular aspect of the present invention wherein the conventional high pressure positive displacement liquid fuel delivery pump is retained in the system, a flow meter is installed in the fuel line between the pump and the PCFD valve and provides a signal proportional to flow rate. A gas turbine controller responsive to that signal positions the PCFD valve actuator to control total fuel flow through the PCFD valve. The PCFD valve has a plurality of orifices on a valve actuator for controlling the flow rate through valve passages downstream of the orifices and which passages connect with the respective combustors. The PCFD valve splits the flow equally to each discharge passage. Because of the pressure compensation, variations in upstream and downstream pressure do not affect the equal volumetric flow rates delivered to the combustors.

Additionally, pump discharge pressure is measured by a pressure transducer installed at the pump discharge. While the volumetric output of the positive displacement pump is essentially constant, it is necessary for a percentage of the pump discharge flow to be recirculated back to the pump inlet via a bypass control valve. The bypass control valve is positioned by the turbine controller in accordance with a pump discharge pressure schedule. The pressure at the PCFD valve inlet is thus maintained at a level sufficient for proper flow control and division of fuel flow.

In another aspect of the present invention particularly useful for original equipment manufacture, the high pressure, positive displacement liquid fuel pump is replaced by a centrifugal pump. The high speed centrifugal pump is driven by an AC electric motor or by an accessory gear, the pump being a conventional design well suited to pumping low lubricity fluids. A flow meter as previously described is located between the centrifugal pump and the PCFD valve and the controller controls the PCFD valve to control the total fuel flow rate through the PCFD valve in response to measurements made by the flow meter. Thus, bypass control of the flow is unnecessary and is omitted.

Consequently, in both embodiments of the present invention, the conventional requirements for lubricity additives for low lubricity fuels and ancillary equipment therefore have been eliminated. The system can operate equally well on many different types of fuels with wide variations in lubricity, density and the like. System reliability is also improved by eliminating problems associated with clogging of components/equipment caused by the lubricity additive. In the first aspect of the invention described above, an existing fuel system, such as a naphtha system, can retain its current positive displacement high pressure fuel pump, bypass control valve and other ancillary equipment, while effecting a replacement of the flow divider with the PCFD valve and flow control with the PCFD valve and flow meter. In a second aspect, the high pressure positive displacement pump itself can be replaced using a reliable off-the-shelf substitute centrifugal pump, the flow meter and PCFD valve similarly providing flow control and division. This is particularly desirable for use with original equipment manufacture.

In a preferred embodiment according to the present invention, there is provided a liquid fuel delivery system for a turbine, comprising a plurality of combustors, a positive displacement pump for pumping liquid fuel to the combustors, a pressure compensated fuel delivery valve for receiving fuel from the pump and dividing the fuel for flow to each of the combustors at an equal predetermined flow rate, a pressure transducer for determining the pressure of the liquid fuel downstream of the pump and upstream of the fuel delivery valve, a pressure control valve disposed between the pump and the fuel delivery valve, a flow meter for determining total rate of liquid fuel flow downstream of the pump and a controller coupled to the pressure transducer and the pressure control valve for controlling the pressure control valve to deliver fuel to the fuel delivery valve at a predetermined pressure and coupled to the flow meter and the delivery valve for controlling the total liquid fuel flow rate through the fuel delivery valve to the combustors.

In a further preferred embodiment according to the present invention, there is provided a method of supplying liquid fuel to the combustors of a turbine, comprising the steps of supplying a low lubricity liquid fuel to a pump, pumping the low lubricity fuel through a main fuel supply line to the combustors, determining the pressure of the low lubricity liquid fuel in the main fuel supply line, controlling the pressure of the low lubricity liquid fuel in the main fuel supply line to a predetermined pressure in response to the step of determining the pressure, determining the rate of flow of the low lubricity liquid fuel in the main fuel supply line and controlling the total flow rate of the low lubricity liquid fuel through the delivery valve to the combustors in response to the step of determining the rate of flow and dividing the total flow of the low lubricity liquid fuel to provide equal rates of flow of the fuel to the combustors.

In a still further preferred embodiment according to the present invention, there is provided a liquid fuel delivery system for a turbine, comprising a plurality of combustors, a centrifugal pump for pumping liquid fuel to the combustors, a pressure compensated fuel delivery valve for receiving fuel from the pump and dividing and delivering fuel at a predetermined flow rate to each of the combustors, a flow meter for measuring the rate of total liquid fuel flow to the pressure compensated fuel delivery valve, a controller coupled to the flow meter and the fuel delivery valve for controlling the total liquid fuel flow rate through the pressure compensated fuel delivery valve to the combustors.

Accordingly, it is a primary object of the present invention to provide a liquid fuel delivery system for the combustors of turbomachinery wherein low lubricity fuels can be used without lubricity additives in both retrofitted and original equipment manufacture fuel delivery systems.

BEST MODE FOR CARRYING OUT THE INVENTION

Figure 1:
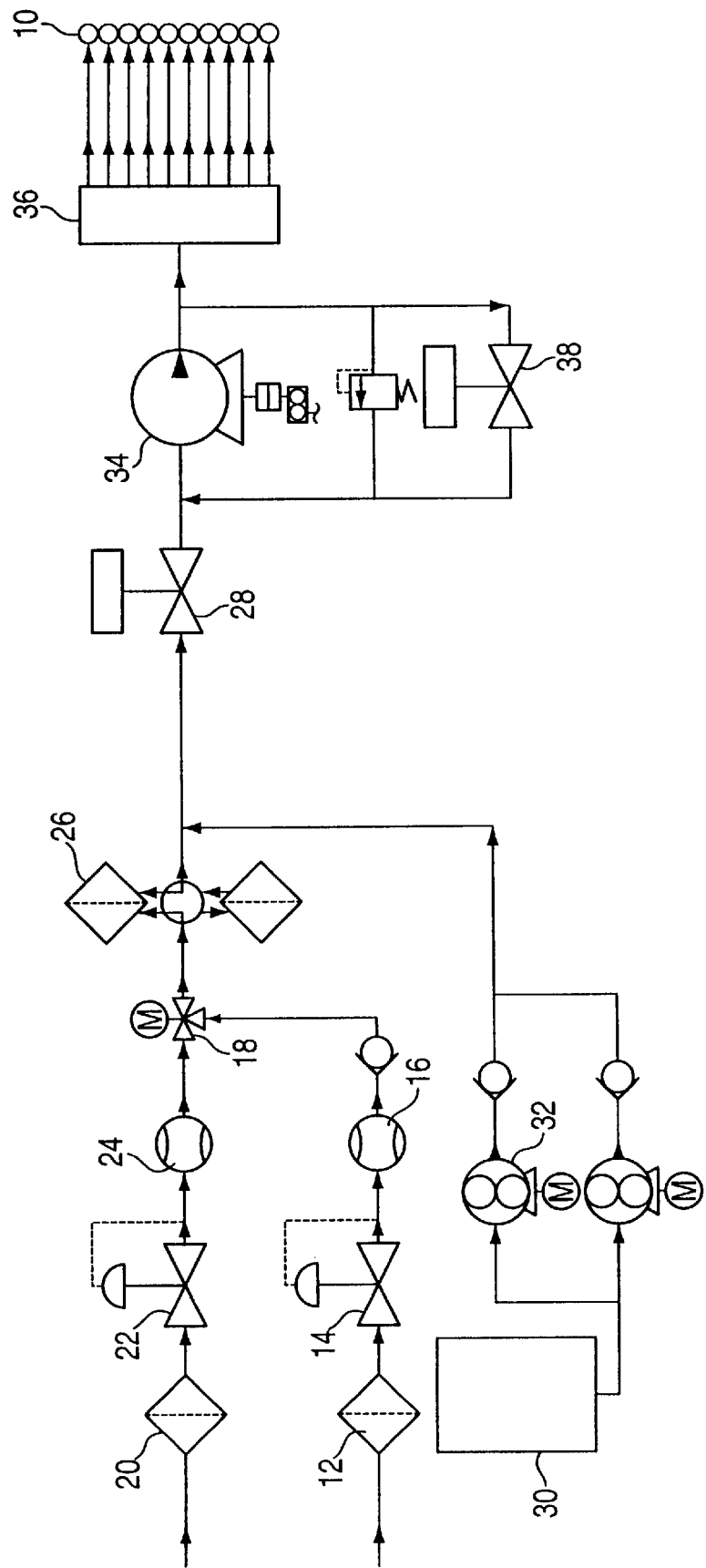
FIG. 1 is a schematic representation of a typical fuel delivery system for a turbine according to the prior art.

Referring now to FIG. 1, there is illustrated a liquid fuel delivery system according to the prior art for delivering liquid fuel to a typical heavy-duty gas turbine with can-annular combustors, for example, the combustors schematically illustrated at 10. Fuel is delivered from a source by forwarding pumps, not shown, which deliver, for example, two liquid fuels, naphtha and a distillate, to the fuel system. A distillate is supplied to the combustors at turbine start-up and shut-down, while naphtha is supplied during operating conditions. As illustrated, the distillate is supplied through a filter 12, a pressure regulating valve 14, a flow meter 16 and a fuel transfer valve 18. Naphtha may be provided through a filter 20, a pressure regulating valve 22, and a flow meter 24 to the fuel transfer valve 18. It will be appreciated that other types of liquid fuels may be employed and that the invention is not limited to a combination of naphtha and distillate or any one of those fuels. The fuel transfer valve supplies one or the other of the liquid fuels to the combustors of the turbine. The fuel supplied to the fuel transfer valve 18 is then passed through duplex filters 26 and on to a shut-off valve 28. In those liquid fuel systems where the principal fuel has low or virtually non-existent lubricity, such as naphtha, a lubricity additive is provided the fuel. To accomplish this, a source 30 of lubricity additive is provided and dual metering pumps 32 supply the additive to the fuel line downstream of the duplex filters 26 and prior to a stop valve 28.

In this conventional fuel delivery system, a positive displacement pump 34, e.g., a screw pump, supplies the liquid fuel at high pressure to a flow divider 36. The flow divider 36 employs sets of paired gears to discharge fuel to respective combustors, the gears for all combustors rotating at the same speed, hence providing a nominally equal volumetric flow rate to each combustor. Within the flow divider, there is a rotational speed feedback device, not shown, to provide a signal to the turbine controller proportional to fuel flow rate. The controller, in turn, uses this signal to control a bypass control valve 38 to control the flow rate provided the divider by the positive displacement pump 34. As noted previously, the gears and bearings of the flow divider must be lubricated when low or non-existent lubricious fuels are supplied. Those fuel additives build up on the surfaces of the flow divider, disadvantageously requiring it to be serviced periodically.

Figure 2:
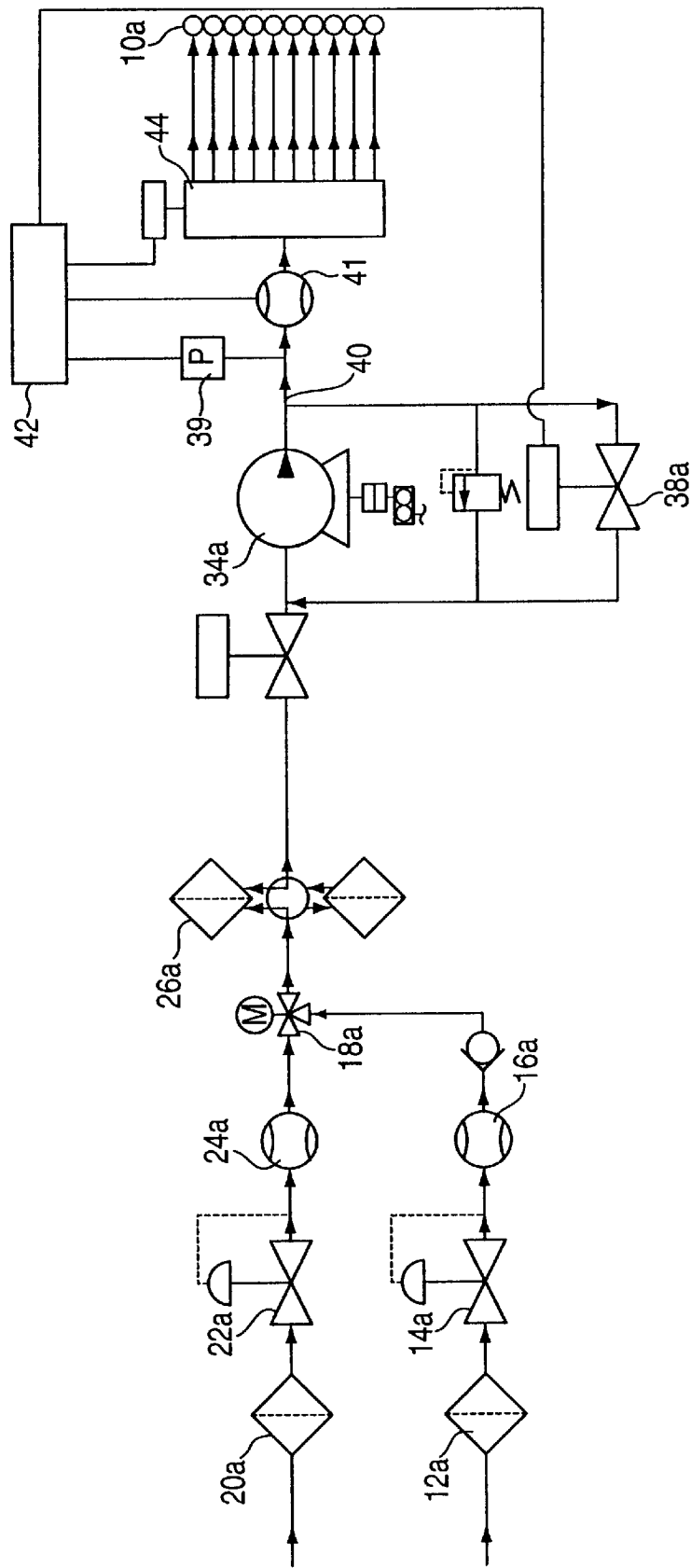
FIG. 2 is a schematic of a liquid fuel delivery system according to the present invention.

Referring now to FIG. 2, there is illustrated a liquid fuel delivery system according to the present invention wherein like reference numerals are applied to like parts as in the prior art of FIG. 1 followed by the suffix "a." In this system, the two liquid fuels are provided to the fuel transfer valve 1 8a similarly as described in the prior art of FIG. 1. Notably absent, however, are the lubricity additive tank 30, the metering pumps 32 and supply lines for supplying a lubricity additive to the fuel. The present fuel delivery system has no need for lubricity additives or ancillary equipment necessary to supply the additives. Instead of controlling the flow rate from the positive displacement pump as in FIG. 1, the pressure of the liquid fuel supplied by the positive displacement pump 34a is controlled to a predetermined pressure, the flow rate to the combustors is controlled by the PCFD valve in combination with the controller and a flow meter, and the flow division is accomplished by the PCFD valve. Particularly, the positive displacement pump 34a provides liquid fuel at a volumetric flow rate at a normally higher pressure than needed by the PCFD valve. To supply fuel at a constant pressure, a pressure transducer 39 monitors the pressure of the liquid fuel in the main supply line 40 and provides an output signal to controller 42. The controller, in turn, supplies a signal to the bypass pressure control valve 38a. The control valve 38a is identical in structure to the bypass control valve 38 of the system illustrated in FIG. 1. However, the valve 38a controls pressure in the supply line 40 and not flow rate. Hence, by sensing the pressure in line 40, the controller adjusts the bypass pressure control valve 38a to supply liquid fuel in line 40 at a predetermined pressure.

A flow meter 41 is also positioned in line 40 and provides a signal proportional to the flow rate in line 40 to the controller 42. The controller 42, in turn, controls an actuator for the PCFD valve. The position of the actuator of the PCFD valve determines the flow rate through each of the outlet passages of the valve and which passages are coupled to the combustors whereby exactly equal flow rates are provided each combustor. Additionally, the PCFD valve affords pressure compensation so that the pressure differential across each of the orifices through the PCFD valve is the same, thus ensuring a constant flow rate through each outlet passage.

Figure 3:
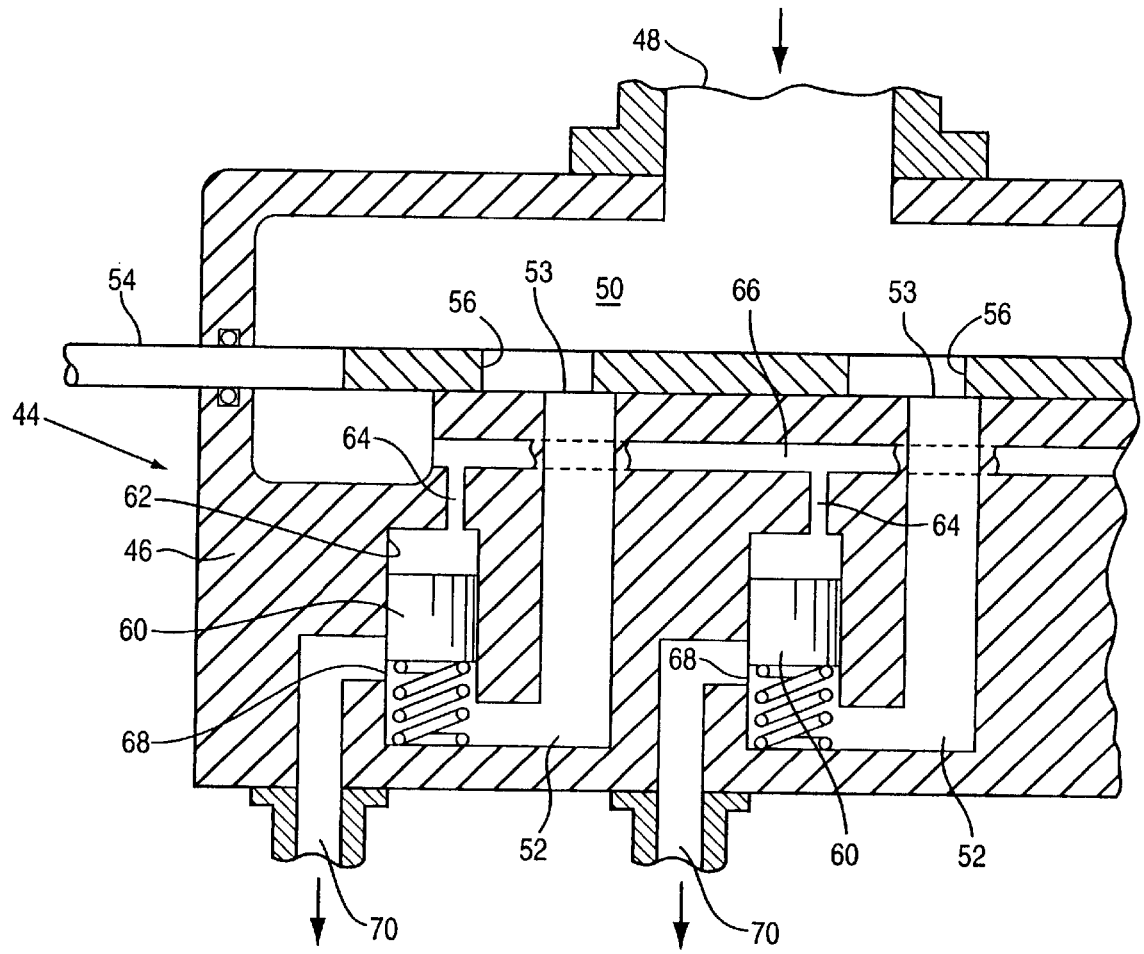
FIG. 3 is an enlarged fragmentary cross-sectional view illustrating a portion of the pressure compensated fuel delivery valve used in the system of the present invention.

Referring now to FIG. 3, there is illustrated a schematic of the pressure compensating fuel delivery (PCFD) valve 44. The fuel delivery valve 44 includes a valve housing 46 having a fuel inlet 48 coupled to the fuel line 40 for receiving fuel into a plenum 50 at a predetermined pressure. The valve body 46 includes passages 52 corresponding in number to the number of combustors 10, each passage 52 supplying an individual combustor with fuel from inlet 48. An actuator 54 having a plurality of orifices 56 is disposed in the valve body 46. From a review of FIG. 3, it will be appreciated that the linear motion of the actuator 54 registers to a greater or lesser extent orifices 56 with respective passages 52 to supply more or less fuel, dependent upon the position of the actuator 54. Consequently, exactly equal flow areas are provided through the valved apertures 53 defined between the orifices 56 and passages 52. Downstream of each orifice 56, there is also provided a pressure compensating spring-biased spool valve 60. Each spool valve 60 lies in a chamber 62 in communication via passageway 64 with the liquid fuel at constant pressure in the plenum 50. The passageways 64 are connected to one another via a manifold 66. Consequently, the upper surfaces of the pistons 60 are exposed to the pressure of the liquid fuel supplied to the PCFD valve. The opposite side of each piston 60 communicates with the associated passageway 52. Additionally, a valved aperture 68 is located at each juncture of the lower end of the piston 60 and a fuel discharge line 70 to a combustor 10.

It will be appreciated that this structure compensates for changes in system pressure and provides identical flow rates to each combustor. For example, if the downstream pressure in any fuel discharge line 70 to a combustor increases, then the increase in downstream pressure will cause the corresponding compensator spool valve 60 to incrementally open the aperture 68 to reduce the pressure drop across the valve by exactly the same amount as the increase in downstream pressure. Consequently, a constant flow rate is maintained as downstream pressure increases. Conversely, in the event of a decrease in downstream pressure, the compensator spool valve 60 incrementally closes the aperture 68, increasing the pressure drop across the line by exactly the same amount as the decrease in fuel nozzle pressure drop. Again, an identical flow rate is ensured to each combustor.

Referring back to FIG. 2, in response to the signal to the controller from the flow meter, the controller 42 through various algorithms operates the actuator 54 of the PCFD valve 44 to provide a selected identical flow rate through the valved apertures 53 depending upon the operating condition of the turbine. The pressure transducer also inputs a signal to the controller 42 which, in turn, controls the bypass pressure control valve 38a to dump excess flow from line 40 thereby providing a predetermined liquid fuel pressure in line 40 and in the PCFD valve. Thus, instead of the flow rate being controlled by the pump 34 and bypass control valve 38 and flow division effected by divider 36, as illustrated in FIG. 1, the present invention controls the pressure in the fuel supply line 40 by using the pressure transducer 39 and controller 42 to control the bypass pressure control valve 38a. Additionally, the controller 42, in response to a signal from the flow meter 41, operates PCFD valve 44 to provide a constant liquid fuel flow rate and division in equal parts of the fuel flow to the combustors through the discharge outlets 70.

Figure 4:
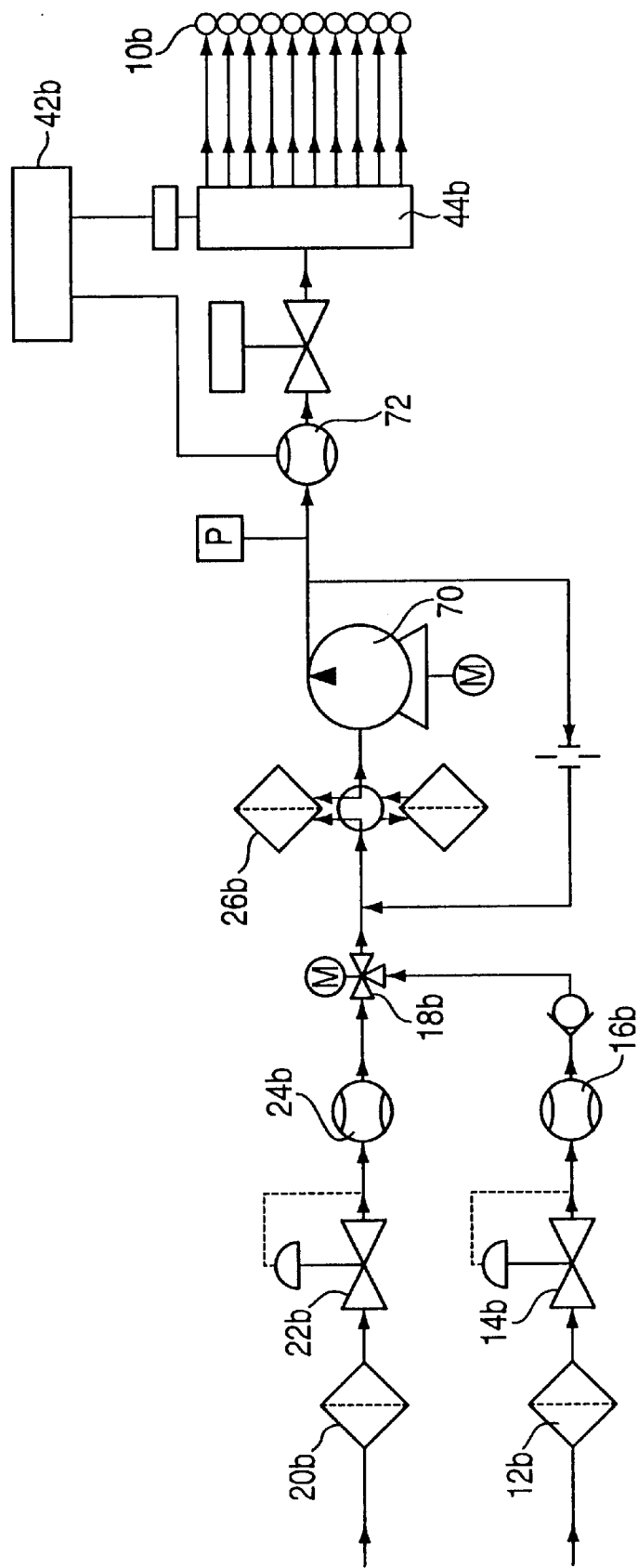
FIG. 4 is a schematic illustration of a liquid fuel delivery system for a turbine according to another aspect of the present invention.

Referring now to FIG. 4, there is illustrated a further embodiment of the present invention, particularly useful for original equipment manufacture, wherein like reference numerals are applied to like parts, followed by the suffix "b." In this form of the invention, the positive displacement pump 34 is replaced by a conventional centrifugal pump 70.

The centrifugal pump 70 does not require a bypass control valve because the centrifugal pump readily adapts to different flow rates. A flow meter 72 is provided in the supply line between the centrifugal pump 70 and the PCFD valve 44b and provides a signal to the controller 42b. The controller 42b, in turn, uses that signal to displace the actuator 54 of the PCFD valve 44b to afford flow control and equal division of the flow to the various combustors. Thus, as the load increases and the fuel flow required increases, the controller senses the increased load and simultaneously opens the valved apertures 53 of the PCFD valve to provide additional fuel to the combustors. Conversely, as the load decreases, the controller senses the decreased load and simultaneously decreases the valved apertures 53 through the PCFD valve to reduce the fuel flow, while continuing to provide pressure compensated equal flow to each combustor.

In lieu of driving the centrifugal pump 70 by the accessory gear box, a variable frequency inverter drive may be provided the pump's AC motor. The variable frequency drive reduces the speed of the AC motor driven pump at part load conditions. Using this type of motor drive improves system energy efficiency at part load conditions by allowing the pump to run at a reduced speed, thereby reducing power consumption and eliminating the need for a pump recirculation flow. Also, the accuracy of the flow division and flow rate control at low loads is improved by reducing the pressure drop across the flow compensating elements in the PCFD valve.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A liquid fuel delivery system for a turbine, comprising:
   a plurality of combustors;
   a positive displacement pump for pumping liquid fuel to the combustors;
   a pressure compensated fuel delivery valve for receiving fuel from said pump and dividing the fuel for flow to each of said combustors at an equal predetermined flow rate;
   a pressure transducer for determining the pressure of the liquid fuel downstream of said pump and upstream of said fuel delivery valve;
   a pressure control valve disposed between said pump and said fuel delivery valve;
   a flow meter for determining total rate of liquid fuel flow downstream of said pump; and
   a controller coupled to said pressure transducer and said pressure control valve for controlling the pressure control valve to deliver fuel to said fuel delivery valve at a predetermined pressure and coupled to said flow meter and said delivery valve for controlling the total liquid fuel flow rate through said fuel delivery valve to said combustors.

2. A delivery system according to claim 1 including a main fuel supply line, a first fuel supply line for supplying a low lubricity liquid fuel to said main fuel supply line, a second fuel supply line for supplying a distillate to said main fuel supply line, a fuel transfer valve for transferring fuel from a selected one of said first and second supply lines for flow through said main fuel supply line to said pump, said main fuel supply line supplying fuel from said first fuel supply line without a lubricity additive supplied either to said first supply line or to said main supply line.

3. A method of supplying liquid fuel to the combustors of a turbine, comprising the steps of:
   supplying a low lubricity liquid fuel to a pump;
   pumping the low lubricity fuel through a main fuel supply line to a pressure compensated fuel delivery valve;
   determining the pressure of the low lubricity liquid fuel in the main fuel supply line;
   controlling the pressure of the low lubricity liquid fuel in the main fuel supply line to a predetermined pressure in response to the step of determining the pressure;
   determining the rate of flow of the low lubricity liquid fuel in the main fuel supply line;
   controlling the total flow rate of the low lubricity liquid fuel through said delivery valve to the combustors in response to the step of determining the rate of flow; and
   dividing the total flow of the low lubricity liquid fuel received by said delivery valve to provide equal rates of flow of the fuel to said combustors.

4. A method according to claim 3 wherein the step of pumping includes pumping fuel by a positive displacement pump.

5. A liquid fuel delivery system for a turbine, comprising:
   a plurality of combustors;
   a centrifugal pump for pumping liquid fuel to the combustors;
   a pressure compensated fuel delivery valve for receiving fuel from said pump and dividing and delivering fuel at a predetermined flow rate to each of said combustors;
   a flow meter for measuring the rate of total liquid fuel flow to said pressure compensated fuel delivery valve;
   a controller coupled to said flow meter and said fuel delivery valve for controlling the total liquid fuel flow rate through said pressure compensated fuel delivery valve to said combustors.

* * * * *